(12) United States Patent
Staats

(10) Patent No.: US 6,373,821 B2
(45) Date of Patent: *Apr. 16, 2002

(54) METHOD FOR SETTING TIME STAMP IN SYT FIELD OF PACKET HEADERS FOR IEEE-1394 DEVICES

(75) Inventor: Erik P. Staats, Ben Lomand, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,499

(22) Filed: Feb. 20, 1998

(51) Int. Cl.$^7$ ................. H04J 3/06; H04J 3/14
(52) U.S. Cl. ............ 370/252; 370/503; 370/394; 348/513
(58) Field of Search ............... 370/252, 394, 370/465, 503, 517; 714/798, 812, 818; 348/461, 464, 467, 469, 425.2, 425.3, 425.4, 512, 513

(56) References Cited

U.S. PATENT DOCUMENTS

| | | | | |
|---|---|---|---|---|
| 4,506,358 A | * | 3/1985 | Montgomery | 370/409 |
| 4,748,620 A | * | 5/1988 | Adelmann et al. | 370/394 |
| 4,894,823 A | * | 1/1990 | Adelmann et al. | 370/252 |
| 5,127,000 A | * | 6/1992 | Henrion | 370/394 |
| 5,319,360 A | * | 6/1994 | Schrodi et al. | 370/390 |
| 5,469,466 A | * | 11/1995 | Chu | 375/354 |
| 5,483,523 A | * | 1/1996 | Nederlof | 370/409 |
| 5,565,924 A | * | 10/1996 | Haskell et al. | 370/503 |
| 5,590,116 A | * | 12/1996 | Zhang | 370/253 |
| 5,661,728 A | * | 8/1997 | Finotello et al. | 370/503 |
| 5,668,601 A | * | 9/1997 | Okada et al. | 370/503 |
| 5,682,384 A | * | 10/1997 | Zarros | 370/394 |
| 5,726,989 A | * | 3/1998 | Dokic | 370/517 |
| 5,742,623 A | * | 4/1998 | Nuber et al. | 714/798 |
| 5,802,057 A | * | 9/1998 | Duckwall et al. | 370/408 |
| 5,838,876 A | * | 11/1998 | Iwamura | 370/503 |
| 5,845,152 A | * | 12/1998 | Anderson et al. | 395/872 |
| 5,878,032 A | * | 3/1999 | Mirek et al. | 370/252 |
| 5,883,891 A | * | 3/1999 | Williams et al. | 370/356 |
| 5,912,880 A | * | 6/1999 | Bernstein | 370/252 |
| 5,930,480 A | * | 7/1999 | Staats | 709/244 |
| 5,973,748 A | * | 10/1999 | Horiguchi et al. | 370/465 |
| 6,006,270 A | * | 12/1999 | Kobunaya | 709/233 |

OTHER PUBLICATIONS

"P1394 Standard For A High Performance Serial Bus", *The Institute of Electrical and Electronic Engineers, Inc., IEEE Standards Department*, P1394 Draft 8.0v3, pp. 1–394 (Oct. 16, 1995).

\* cited by examiner

*Primary Examiner*—Chau Nguyen
*Assistant Examiner*—Phuongchau Ba Nguyen
(74) *Attorney, Agent, or Firm*—Blakely, Sokoloff, Taylor & Zafman LLP

(57) ABSTRACT

Isochronous data packets transmitted within a digital network having a bus architecture that complies with the IEEE-1394 Standard for a High Performance Serial Bus are stamped with a presentation time stamp value determined according to a computed packet rate for the data. For the case where the presentation time stamp field of a first packet of a second frame of data for transmission in the digital network is set with the presentation time value, the packet rate may be computed by measuring a difference between a desired presentation time value of a first packet in a first frame of the data and an actual transmission time of the first packet of the first frame. The first frame preceding the second frame in time of transmission within the network.

5 Claims, 6 Drawing Sheets

METHOD FOR SETTING TIME STAMP IN SYT FIELD OF PACKET HEADERS FOR IEEE-1394 DEVICES

FIELD OF THE INVENTION

This invention relates generally to data communications and, more particularly, to a method for controlling isochronous data communications within a digital system having a bus architecture that complies with the IEEE-1394 Standard for a High Performance Serial Bus.

BACKGROUND

The components of a computer or other digital system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards including IEEE standards document 1394, entitled *Standard for a High Performance Serial Bus* (hereinafter "IEEE-1394 Serial Bus Standard"). A typical serial bus having the IEEE-1394 standard architecture is comprised of a multiplicity of nodes that are interconnected via point-to-point links, such as cables, that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the IEEE-1394 Serial Bus Standard may be used as an alternate bus for the parallel backplane of a computer system, as a low cost peripheral bus, or as a bus bridge between architecturally compatible buses.

A communications protocol of the IEEE-1394 Serial Bus Standard specifies two primary types of bus access: asynchronous access and isochronous access. Asynchronous access may be either "fair" or "cycle master". Cycle master access is used by nodes that need the next available opportunity to transfer data. Isochronous access is used by nodes that require guaranteed bandwidth, for example, nodes transmitting video or audio data. The transactions for each type of bus access are comprised of at least one "subaction", wherein a subaction is a complete one-way transfer operation.

In the case of, for example, digital video data transfers within digital systems conforming to the IEEE-1394 Serial Bus Standard, the video data may be transferred for example, between a mass storage device (e.g., a digital memory such as a hard disk drive, a flash memory device or other storage medium) and a digital video camera or other recorder (e.g., to store an edited video sequence) under the control of a computer processor or other device (e.g., a DMA controller). The video data is transferred as a series of frames, each frame being made up of a number of data packets. The individual data packets include a number header fields (which include various information regarding the data as well as addressing information) as well as the video data itself.

In order to ensure that each frame of the video data is played out in the proper sequence, the frames must be "time stamped" with an appropriate frame presentation time (e.g., measured in terms of "cycle time" of an isochronous transaction on a bus complying with the IEEE-1394 Serial Bus Standard) when they are recorded. The frame presentation time for individual frames of data is recorded in a particular header field, referred to as an SYT field, of the first packet of each frame (note that for non-video applications, the concept of a "frame" is not used and the SYT field may be located and stamped in each packet or only some of the packets of a data transfer). In essence, the frame presentation time "stamped" in the SYT field of the packet header is an indication to the receiver of the time that the frame should be played out. For digital video data, the frame presentation time may be up to 450 μsec. in the future. That is, from the point of view of the receiver, the SYT field frame presentation stamp value for a given frame of data must be within 450 μsec. of the time the first packet in that frame is received. Thus, in the example given above, when the digital video data is transferred from the mass storage device to the recording medium, the computer processor or other device which is controlling the transfer must insert appropriate frame presentation time stamp (or SYT) values into the SYT fields of the first packet in each frame of the video data. Note that the 450 μsec. requirement is specific to video data and other types of data, e.g., MIDI audio data, may have other frame presentation time requirements.

In the past, such time stamping operations have required the use hardware interrupt procedures to determine a current cycle time which could then be written to the SYT field of a packet. However, there are times at which such interrupt procedures cannot be completed within the 450 μsec. (e.g., for digital video applications) time limitation. As a result, some frames of data are "lost" and any resulting display of the entire video data stream is degraded. It would therefore be desirable to have other solutions which do not rely on the hardware interrupt procedures of the past for time stamping the SYT fields of data in a digital network complying with the IEEE-1394 Serial Bus Standard.

SUMMARY OF THE INVENTION

Methods for controlling isochronous data communications within a digital system having a bus architecture that complies with the IEEE-1394 Standard for a High Performance Serial Bus are described.

In one embodiment, a presentation time stamp field of a packet of data for transmission in a digital network is set with a presentation time value determined according to a computed packet rate for the data.

In a further embodiment, a presentation time stamp field of a first packet of a second frame of data for transmission in a digital network is set with a presentation time value determined according to a computed packet rate for the data. The packet rate may be computed by measuring a difference between a desired presentation time value of a first packet in a first frame of the data and an actual transmission time of the first packet of the first frame. The first frame preceding the second frame in time of transmission within the network.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
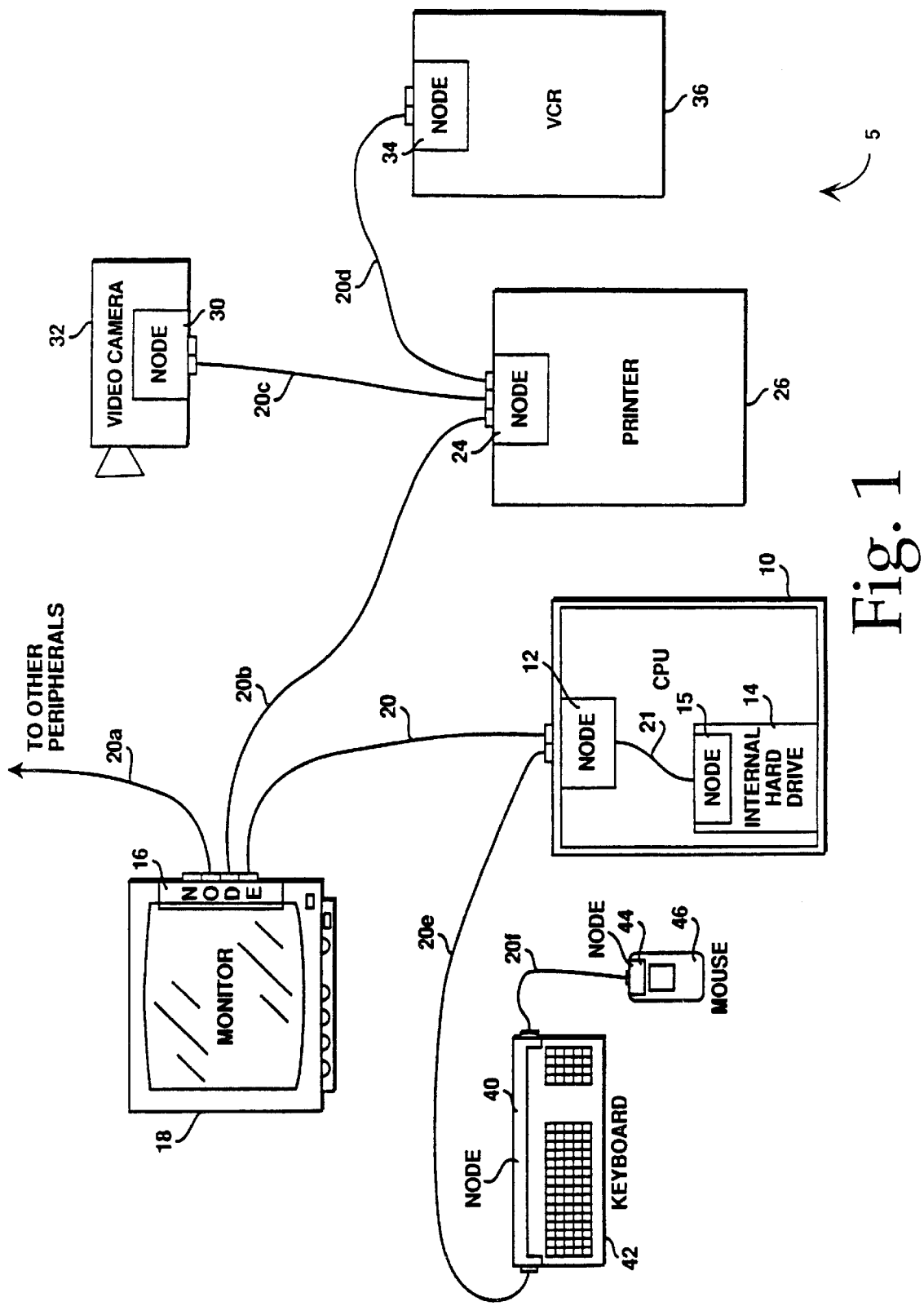
FIG. 1 illustrates a digital system having a serial bus made up of a number of nodes and supporting the control of isochronous data according to one embodiment of the present invention.

As described herein, methods for controlling isochronous data communications within a digital system having a bus architecture that complies with the IEEE-1394 Standard for a High Performance Serial Bus are provided. For example, FIG. 1 shows an exemplary digital system utilizing the methods of the present invention. As will be described in detail below, in one embodiment presentation time stamp fields of data packets for transmission in the digital network may be set with a presentation time value determined according to a computed packet rate for the data. The packet rate may be computed by measuring a difference between a desired presentation time value and an actual transmission time of the first packet of a frame of data transmitted prior to a current frame of interest. Although the present invention is described with reference to the transmission of video data within digital network 5, it should be noted that for non-video applications the concept of a "frame" is not used and the SYT field may be located and stamped in each packet or only some of the packets of a data transfer. The present invention is applicable to any digital data transmission within a network having a bus architecture that complies with the IEEE-1394 Standard for a High Performance Serial Bus and is not limited to video data transfer applications.

Some portions of the detailed description which follows are presented in terms of data structures, algorithms and symbolic representations of operations on data within a computer network and/or a computer memory. These descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical and/or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying", or the like, refer to the actions and processes of a computer or other digital system that manipulates and transforms data represented as physical (electronic) quantities within the computer system's registers and memories into other data similarly represented as physical quantities within the computer system memories or registers or other such information storage, transmission or display devices.

The digital system 5 of FIG. 1 includes a central processing unit (CPU) 10, a monitor 18, a printer 26, a video camera 32, a video cassette recorder (VCR) 36, a keyboard 42, and a mouse 46. The CPU 10 includes an internal hard drive 14 and a memory (not shown). Each of the devices of digital system 5 is coupled to a local node of the serial bus. In general, the device to which a node is coupled acts as the "local host" for that node. For example, the CPU 10 is the local host for the CPU node 12; the monitor 18 is the local host for the monitor node 16; the printer 26 is the local host for the printer node 24; the video camera 32 is the local host for the video camera node 30; the VCR 36 is the local host for the VCR node 34; the keyboard 42 is the local host for the keyboard node 40; the mouse 46 is the local host for the mouse node 44; and the internal hard drive 14 is the local host for the internal hard drive node 15. Those skilled in the art will appreciate that it is not always necessary for every node to have a local host, nor is it necessary that a local host always be powered.

A point-to-point link such as cable 20 is used to connect two nodes to one another. CPU node 12 is coupled to internal hard drive node 15 by an internal link 21, to monitor node 16 by cable 20, and to keyboard node 40 by a cable 20e. The keyboard node 40 is coupled to the mouse node 44 by a cable 20f. The monitor node 16 is coupled to the nodes of the other peripherals (not shown) by cable 20a and to the printer node 24 by cable 20b. The printer node 24 is coupled to the video camera node 30 by cable 20c and to the VCR node 34 by cable 20d. Each of the cables 20-20f and the internal link 21 may be constructed in accordance with the IEEE-1394 Serial Bus Standard and may include a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of a particular local host. For example, each node may have one or more ports, the number of which is dependent upon its needs. For example, CPU node 12, as illustrated, has 3 ports, while the mouse node 44 has only 1 port.

Digital system 5 supports the transfer of data packets (e.g., made up of digital video and/or audio) associated with a data stream. For example, digital video data from hard drive 14 may be transmitted to video camera 32, e.g., for recording onto digital video tape. The video data transmitted to video camera 32 will comprise isochronous data packets in accordance with the IEEE-1394 Serial Bus Standard. Each of these isochronous data packets will include header information and payload information. The payload information comprises the video data to be recorded. The header information is used for routing the video data to the video camera 32 and for error detection and correction. In addition, and in accordance with one embodiment of the present invention, the header information of the first packet for each frame of the video data includes a presentation time stamp value within an SYT field of the header. The presentation time stamp value is determined according to a computed packet rate for the data, as discussed further below.

The video data is transmitted on a particular isochronous channel within digital system 5. The isochronous channel is identified by a channel identification number (channel ID). The channel ID is maintained in a data record stored in the digital system 5 (e.g., in the memory associated with CPU 10) and is used by the various application programs and driver routines running on CPU 10 to coordinate the transfer of data. The use of a common channel ID allows the interoperation of application programs, driver routines, and other software routines which otherwise may not be capable of operating together.

When video data is to be transmitted, the present invention takes advantage of a feature of currently available hosts designed for use with the IEEE-1394 Serial Bus Standard. Current hosts (and/or their associated nodes) may be programmed to begin transmitting isochronous data on a particular cycle number. The cycle number is determined from the cycle time found in the cycle start packet broadcast by the cycle master on the bus. The cycle time indicates the cycle number. Thus, according to the present invention, the local host and/or its respective node, associated with the data transmitting device is programmed to begin transmission on a particular isochronous cycle number ("N"). Then, assuming that "M" data packets are to be transmitted for each frame (i.e., M is a computed packet rate for the data) and that "x" represents the frame number, then the frame presentation time value to be stamped in the SYT field of the first packet for each frame of data to be transmitted is given by:

$$SYT[x]=N+Mx+a, \qquad (1)$$

where the value "a" is a precomputed offset. In the case of digital video, $$0<a<450 \;\mu sec.$$

For example, if the transmitter is programmed to begin transmitting frame O on cycle O (i.e., N 0), then $$SYT[0]=a$$

$$SYT[1]=M+a$$

$$SYT[2]=2M+a$$

.

.

.

$$SYT[y]=yM+a$$

This SYT value may be precomputed for the data (e.g., using equation (1) above) in advance of the actual data transmission, thus avoiding the hardware interrupt latency issues described above. When the packets are ready for transmission, the appropriate SYT value is written into the SYT field of the first packet (e.g., using conventional techniques for establishing the header of a packet to be transmitted on a bus complying with the IEEE-1394 Serial Bus Standard) for each corresponding frame of data to be transmitted.

Unfortunately, M, the packet rate for the data, may not be an integer value. For example, in the case of digital video to be displayed on an NTSC compatible device (e.g., a television or video monitor), $M \approx 266.973$. This presents a problem because only an integer number of packets can be transmitted for each frame (i.e., there are no partial packets and even an empty packet counts as one). In addition, there are occasions where no packets are transmitted during an isochronous cycle (e.g., a "missed" cycle). Each of these situations must be accounted for.

The present invention accommodates the need for a non-integer M as follows. Assume that the desired average M (hereafter $M_{av}$) to maintain proper synchronization is 266.5 (as indicated above, NTSC compatibility requires $M \approx 266.973$, however, for simplicity in the following examples, 266.5 is used). To achieve an overall $M_{av}=266.5$, sometimes the transmitter will need to send 266 packets/ frame and sometimes 267 packets/frame. To accommodate such varying frame lengths, a data stream command language is provided. The data stream command language (DCL) is, in one embodiment, a set of commands that control data flow into or out of a data stream, such as the data stream between hard drive 14 and camera 32 discussed above. A collection of DCL commands are connected together into a linked list to form a DCL program which can be assigned to a particular data stream such as a data stream associated with an isochronous channel. The default execution order of a DCL program is to start with the first DCL command in the program and to follow the DCL command links. This execution order may be changed by using DCL jump commands. Accordingly, if every frame in a data stream is characterized by a DCL program which includes 267 packets/frame, appropriate DCL jump commands may be inserted into the program stream to allow a transmitter to send 267 packets per frame or to send only 266 packets per frame.

Figure 2:
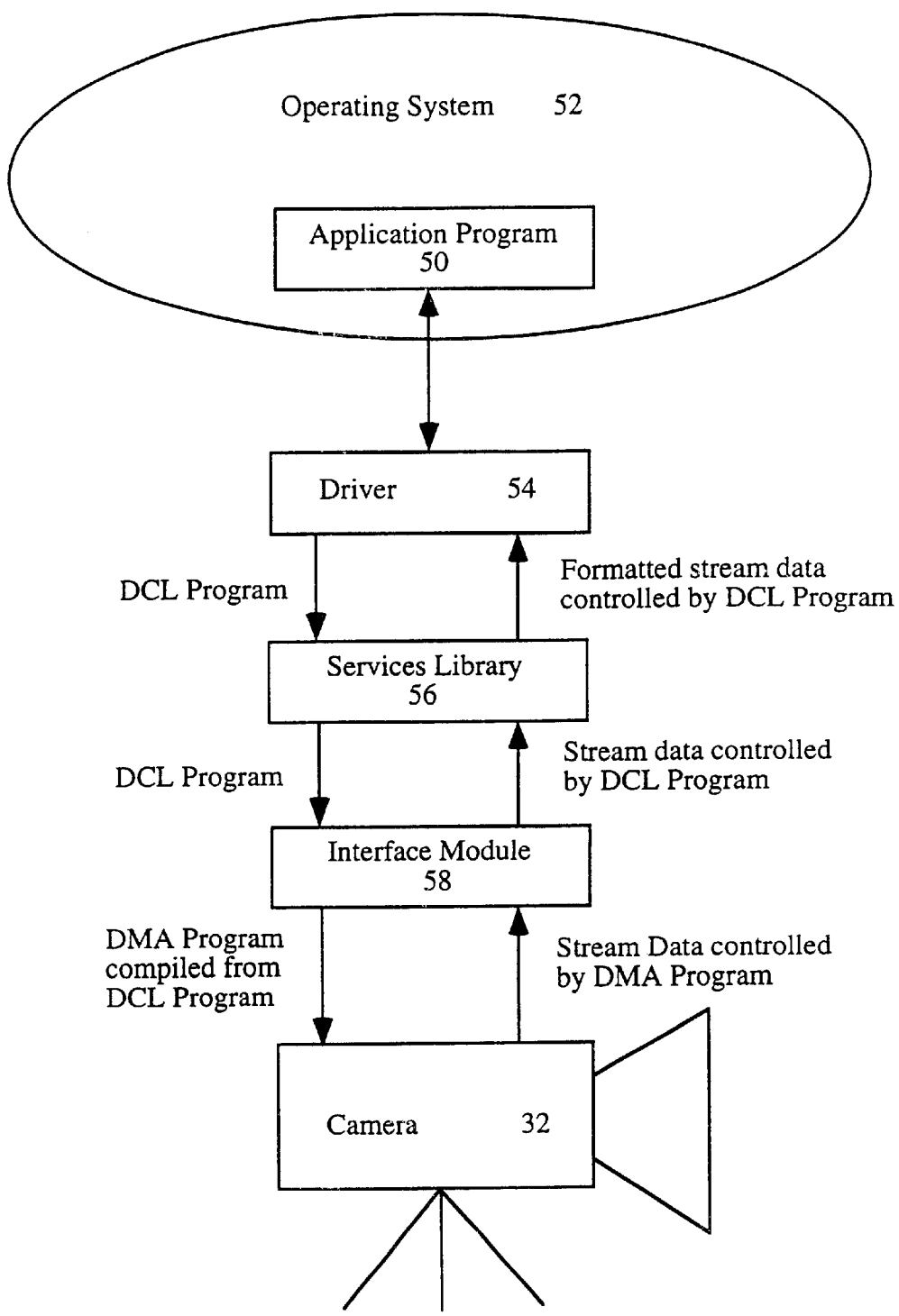
FIG. 2 shows an exemplary software architecture supporting a Data Stream Command Language (DCL) according to one embodiment of the present invention.

FIG. 2 illustrates a software architecture 48 supporting the DCL. An application program 50 running on digital system 5 (e.g., in conjunction with an operating system 52) may provide a user interface which allows a user to control the transfer of digital video data to camera 32. A driver 54 called by the application program 50 may utilize DCL services provided by a services library 56 to develop a DCL program to control the data streams which make up the transfer. Each data stream contains data packets as described above and in the IEEE-1394 Serial Bus Standard.

The DCL program generated by the driver 54 will consist of a nil terminated linked list of DCL commands. At least a minimum set of commands are provided to control the data stream. For example, a DCLSendPacketStartOp command may be used to specify the first part of a packet to be sent to a data stream (e.g., from hard drive 14). Subsequent parts of a packet may be specified using a DCLSendPacketOp command. A packet is defined as a contiguous string of DCL packet commands that start with a DCL packet start command and end with any DCL command that is not a DCL packet command. Thus, scatter/gather lists may be used in constructing packets. To determine the total size of a packet, a DCL compiler (e.g., an interface module 58) may sum respective size fields in any DCL packet start and packet commands defining the packet of interest. DCL send packet buffers need not include a packet header. Instead, a packet header will be constructed by the compiler, based upon the channel number for the data stream associated with the DCL program, any tag and sync bits specified by a DCLSetPacketAttributes command and the computed length of the packet. Exemplary DCLCommands and records, e.g., DCLSendPacketStartOp, DCLSendPacketOp, DCLTransferPacket, DCLReceivePacketStartOp, DCLReceivePacketOp, DCLReceiveBufferOp, DCLCallProcDCLSetPacketAttributesOp, DCLLabelOp, and DCLJumpOp are described in detail in U.S. patent application Ser. No. 08/731,173, entitled "Software Architecture for Controlling Data Streams", filed Oct. 10, 1996, by Erik P. Staats and assigned to the Assignee of the present application, the entire disclosure of which is incorporated herein by reference.

Figure 3:
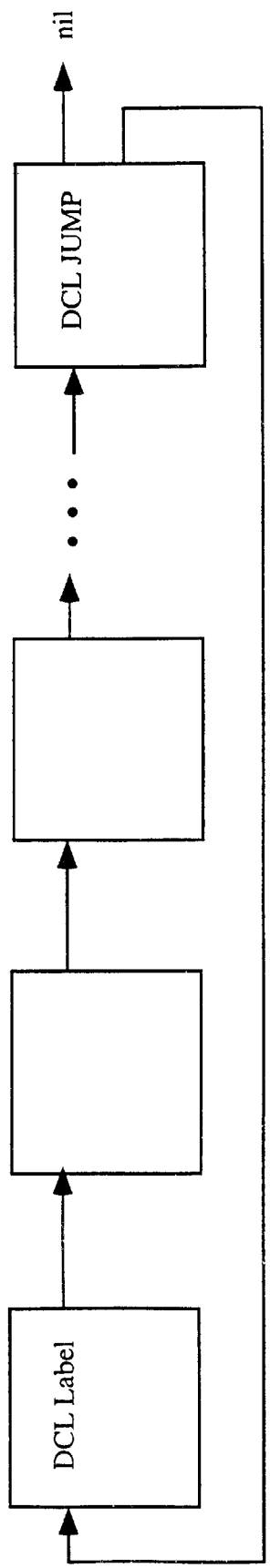
FIG. 3 illustrates a nil terminated DCL program having DCLJump commands to allow for the transmission of varying packet rates within a digital network according to one embodiment of the present invention.

The DCLJumpOp command is used to change the default order of a DCL program. For example, the DCLJumpOp command may be used by a driver to create a looping DCL program, as shown in FIG. 3. The DCL program includes the DCLJump command which allows for the looping (e.g., by pointing to an earlier DCL label in the program stream) and is also nil terminated to allow for ease of compilation.

The DCLJumpOp command may use the following record.

```
struct DCLJumpStruct
{
    DCLCommandPtr    pNextDCLCommand;
    UInt32           compilerData;
    UInt32           opcode;
    DCLLabelPtr      pJumpDCLLabel;
};
typedef struct DCLJumpStruct DCLJump
                             *DCLJumpPtr;
    pNextDCLCommand   Link to next DCL command in
                      program.
    compilerData      DCL compiler's private data.
    opcode            Opcode specifying type of DCL
                      command.
    pJumpDCLLabel     Pointer to DCL label to jump to.
```

The pJumpDCLLabel field specifies the DCL label command to jump to.

The services library 56 also provides a means to update a DCL program. The SetDCLProgramCompilerNotificationProc sets the routine to call when a DCL program is updated and is typically called by an interface module. If a driver wishes to change a DCL command while a DCL program is running, the compiler must be notified to change the corresponding DMA commands. This may happen, for example, if a driver wishes to change the destination of a DCL jump command by calling DCLModifyJump (see below). The DCLModifyJump routine will call the DCL program's notification routine and pass it the DCL jump command that has been modified. The modification routine then makes any changes necessary to change the target of the jump command. Typically, this will involve changing the destination of a DMA branch command. A sample call is as follows.

```
OSStatus    SetDCLProgramCompilerNotificationProc (
    DCLProgramID                 dclProgramID,
    DCLCompilerNotificationProc  dclCompilerNotificationProc);
—>  dclProgramID                 DCLProgramID to set start
                                 event of.
—>  dclCompilerNotificationProc  Proc to call on DCL program
                                 updates.
```

The ModifyDCLJump operation is provided to modify a DCL jump command in a DCL program that is currently running. A sample call for this routine is as follows.

```
OSStatus    ModifyDCLJump         (
    DCLProgramID                 dclProgramID,
    DCLJumpPtr                   pDCLJump,
    DCLLabelPtr                  pDCLLabel);
—>  dclProgramID                 DCLProgramID to set start
                                 event of.
—>  pDCLJump                     Pointer to DCL jump
                                 command to modify.
—>  pDCLLabel                    Pointer to new destination of
                                 the DCL jump command.
```

This routine may be called while a DCL program is in progress as illustrated with reference to FIG. 4. Suppose the DCL program 100 shown in FIG. 4 has been created to transfer video data to camera 32, e.g., for recording on a video tape. Ideally, as a frame of data is transmitted from a respective buffer (e.g., in memory or hard drive 14) to the camera 32 as part of an associated data stream, the buffer's contents will be updated by the associated driver with a new frame of data. However, to account for situations where the packet rate must be varied (e.g., to achieve a non-integer average packet rate), the program is written to always transmit a certain number of packets per frame (e.g., 267 packets/frame) unless certain jump instructions (e.g., jump instruction 100) are modified as the program is running.

Figure 4:
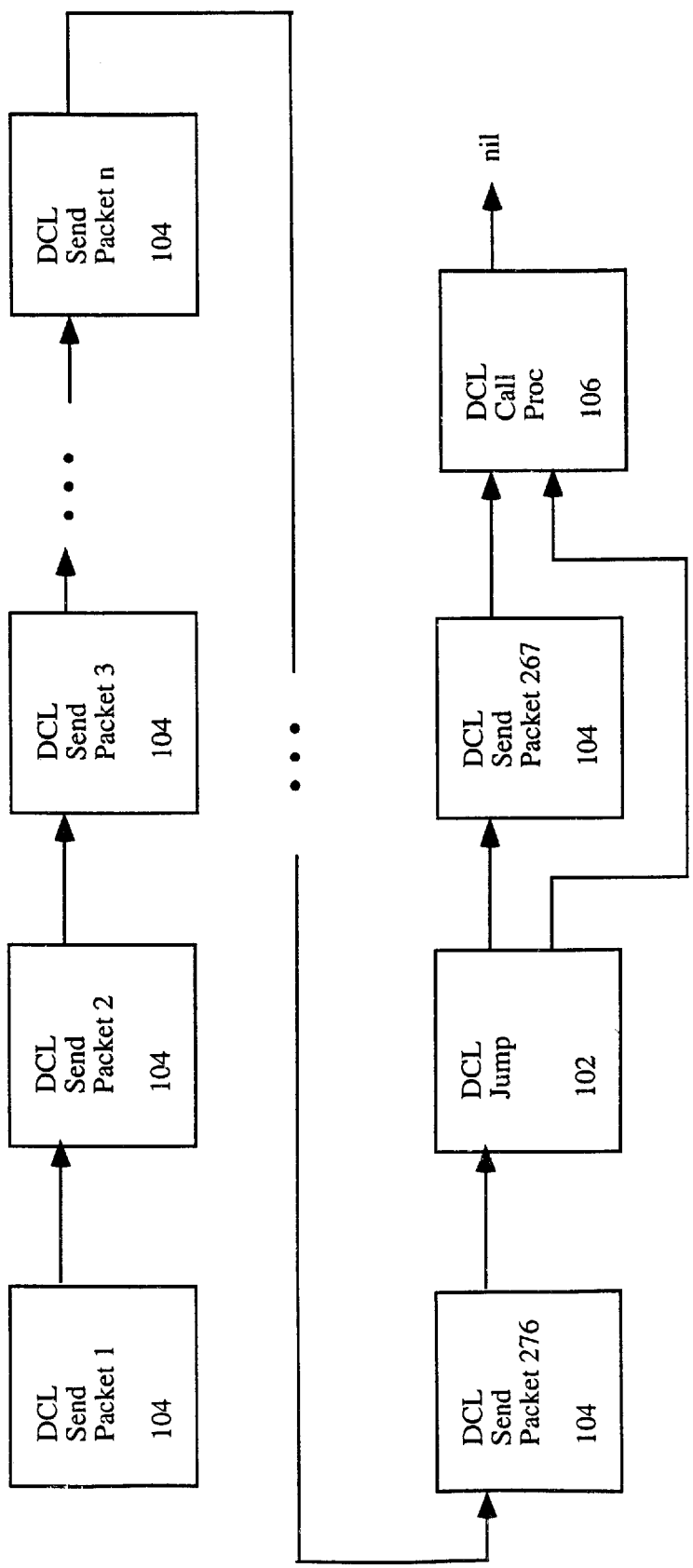
FIG. 4 illustrates one example of a DCL program which may utilize a ModifyDCLJump operation to control a data stream in a digital system according to one embodiment of the present invention.

To further illustrate, as shown in FIG. 4, a driver has created a frame transmission operation having a number of DCL send packet commands 104. In total, 267 packets/frame are transmitted. At the end of each frame transmission operation is a DCL call procedure (call proc) command 106 which notifies the driver that a frame of data has been sent and that the associated buffer should be updated with new data. After the send packet command 104 regarding packet number 266, the driver has placed a DCL jump command 102. So long as the data in a buffer following a DCL jump command should be transmitted, the DCL jump command will simply jump to a DCL label (note, for clarity the label commands have not been shown in FIG. 4) before that buffer, allowing the associated data in the buffer to be passed to the data stream. However, if the buffer following a DCL jump command contains a packet which should not be transmitted (e.g., when only 266 packets/frame are to be transmitted), the DCL jump command will jump to a DCL label beyond that packet. Thus, whenever the driver is notified to only transmit 266 packets, it will call ModifyDCLJump to set the DCL jump command before the 267$^{th}$ packet to point to a DCL label beyond the associated buffer (i.e., DCL jump command 102 will be modified to point to DCL Call Proc command 106). thus, the 267$^{th}$ packet (which, is an empty packet as there are typically fewer than 266 packets of true video data per frame—the remaining packets being empty packets) will be sent.

To determine when the driver should be notified to only send 266 packets, the following routine is used. A value "$\Delta$" is computed so that when $\Delta \geq 1, M=267$, and $\Delta < 1, M=266$, where $\Delta_z = SYT[z] - $(cycle start # for frame z)$-a$.

The cycle start # for the frames is always incremented by the current M to achieve the desired overall average frame rate ($M_{av}=266.5$ in this example). The current M is then adjusted (e.g., using the ModifyDCLJump procedure described above) according to the $\Delta$ for the previously transmitted frame.

To illustrate, assume again that the desired $M_{av}$=266.5 and that the host transmitter is programmed to begin transmitting frame 0 on cycle 0. If M is established to begin at 266 and a=2 (i.e., representing an offset of twice the frame period or 250 μsec.), then new values for M are computed as shown in Table 1 below:

TABLE 1

| M | SYT[x] = N + $M_{av}$x + a | cycle #to begin transmission of frame x | Δ |
|---|---|---|---|
| 266 | SYT[0] = 0 + (266.5)(0) + 2 = 2 | frame[0] begins on cycle 0 | 0 |
| 266 | SYT[1] = 0 + (266.5)(1) + 2 = 268.5 | frame[1] begins on cycle 266 | 0.5 |
| 266 | SYT[2] = 0 + (266.5)(2) + 2 = 535 | frame[2] begins on cycle 532 | 1.0 |
| 267 | SYT[3] = 0 + (266.5)(3) + 2 = 801.5 | frame[3] begins on cycle 799 | 0.5 |
| 266 | SYT[4] = 0 + (266.5)(4) + 2 = 1068 | frame[4] begins on cycle 1065 | 1.0 |
| 267 | SYT[5 = 0 + (266.5)(5) + 2 = 1334.5 | frame[5] begins on cycle 1332 | 0.5 |
| . . | . | . | . |
| . . | . | . | . |

From the above Table 1, it can be seen that an SYT value for a current frame is computed using a current M. Then, Δ is computed for the current frame and M is adjusted accordingly for the next frame to achieve an $M_{av}$ of 266.5.

Figure 5:
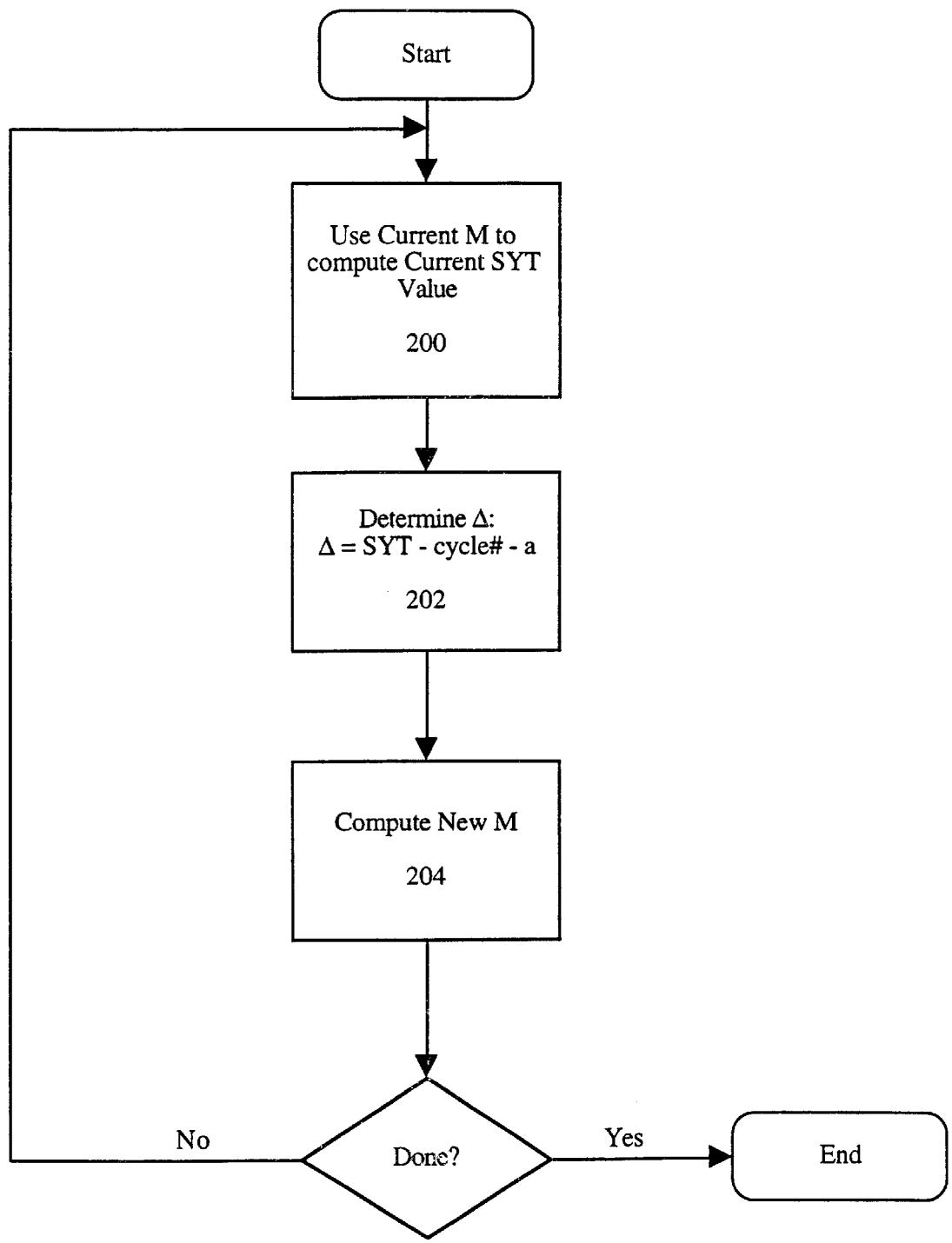
FIG. 5 is a flow diagram illustrating one embodiment of the present invention and, particularly, a process for calculating a frame presentation time value from a computed data packet rate and the determination of a new packet rate based thereon.

In addition, the present invention (at least in this one embodiment) involves setting a presentation time stamp field (the SYT field) of a first packet of a given frame of data for transmission in a digital network with a presentation time value (e.g., the SYT value from column 2 of the above table) determined according to a computed packet rate (e.g., M) for the data. The packet rate M for any given frame may be computed as the difference between the SYT value for the previous frame and that previous frame's corresponding cycle # (i.e., the cycle # at which the first packet of that previous frame was transmitted) minus a (where a=a pre-computed offset). This method is summarized in FIG. 5.

As shown, at step 200, a current packet rate (M) is used to compute a current SYT value for a frame as described above. Then, in step 202, a new Δ is determined as the difference between the current SYT value and the corresponding cycle # for the frame minus a. Based on the new Δ, a new packet rate is determined at step 204. This new packet rate may be used to compute the next M value for the next frame, and so on until all the packets have been transmitted.

If no missed cycles had to be accounted for (i.e., if it were assured that a packet were transmitted on each cycle), the above scheme would be complete. However, sometimes a packet is not transmitted every cycle, e.g., if the transmitter is denied access to the bus on a given cycle. In this event, the "missed" packet will be transmitted in the next cycle, i.e., one cycle late. The above algorithm assumes that one packet was transmitted every cycle and would not account for the missed cycle. For example, if in the above table frame[2] actually began transmission on cycle #533 and not 532 as predicted, the actual Δ for frame[2] would be 0 and not 1.0. Thus, at this point M should be held at 266 to accommodate the missed cycle. Instead, however, the above algorithm predicted that Δ for frame[2] was 1.0 and, accordingly, changed M to 267. This causes video to be lost as shown in Table 2 below:

TABLE 2

| M (based on predicted Δ) | SYT[x] | predicted cycle #to begin transmission of frame x | Δ (predicted) | actual cycle # transmission of frame x began | Δ (actual) |
|---|---|---|---|---|---|
| 266 | SYT[O] =2 | frame[0] →0 | 0 | 0 | 2 |
| 266 | SYT[1] = 268.5 | frame[1] → 266 | 0.5 | 266 | 0.5 |
| 266 | SYT[2] = 535 | frame[2] → 532 | 1.0 | 533* | 0** |
| 267 | SYT[3] = 801.5 | frame[3] → 799 | 0.5 | 800 | −0.5*** |

*indicates missed cycle
**M should be held at 266 at this point to accommodate the missed cycle
***indicates lost data because the frame was sent too late To accommodate the possibility that missed cycles may occur, the actual cycle # that a frame begins transmission on must be determined and accounted for. Current local hosts and/or their associated nodes developed to be compatible with the IEEE-1394 Serial Bus Standard include a register which maintains the current cycle time. This register can be read during transmit operations and, as a result, a track of the actual cycle time (or cycle #) that transmission of a frame is commenced may be determined. This actual frame transmission time may be compared with (or used in lieu of) the predicted transmission time to compute an appropriate M so as to maintain frame synchronization.

Figure 6:
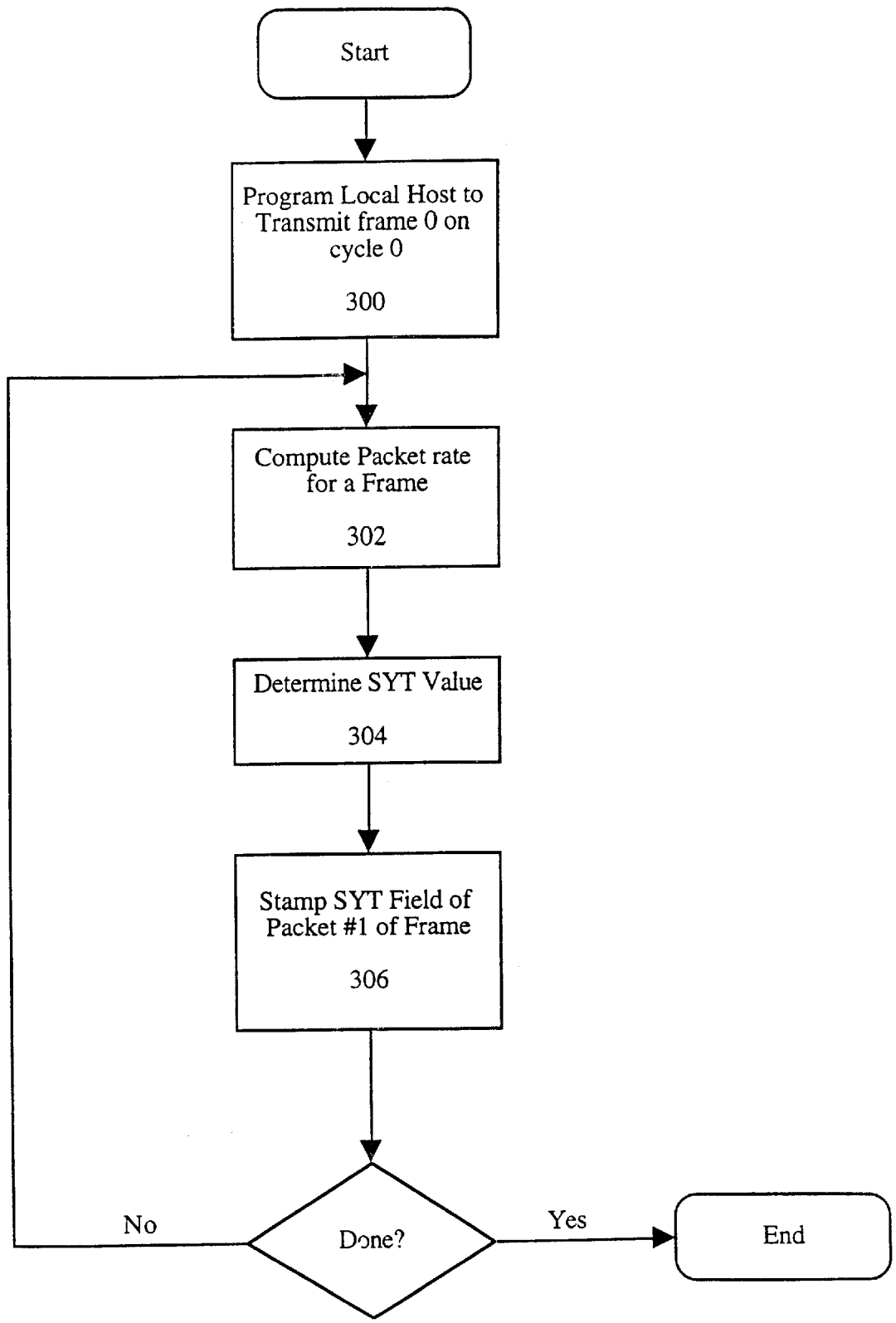
FIG. 6 is a flow diagram which summarizes a process for determining a frame presentation time value for frames of data to be transmitted in a digital network according to one embodiment of the present invention.

Thus a scheme for controlling isochronous data communications within a digital system having a bus architecture that complies with the IEEE-1394 Standard for a High Performance Serial Bus has been described. The process is summarized in FIG. 6 as follows. At step 300, a host is programmed to begin transmission of data on a desired cycle #, e.g., cycle 0. The packet rate for the data is computed (or preset for the first frame as discussed above) at step 302 and, at step 304, the appropriate SYT value based on the computed packet rate is determined. This SYT value may be stamped into the SYT field of the first packet of the frame at step 306. The process of determining a packet rate (e.g., based on the SYT value of a previous frame as discussed above) continues until all frames of the data have been transmitted or the process has otherwise been terminated. In the foregoing specification, the invention has been described with reference to specific exemplary embodiments thereof. It will, however, be appreciated by those skilled in the art that various modifications and changes may be made thereto without departing from the broader spirit and scope of the invention as set forth in the appended claims. The specification and drawings are accordingly, to be regarded in an illustrative rather than a restrictive sense.

What is claimed is:

1. A computer readable medium having stored thereon a plurality of sequences of instructions, said plurality of sequences of instructions including sequences of instructions which, when executed in a digital network including a plurality of nodes interconnected by a plurality of point-to-point links, cause one of said nodes to set a presentation time stamp field of a first packet of a second frame of data for transmission in the digital network with a presentation time value determined according to a computed packet rate for the data, wherein the data for transmission includes a plurality of frames and wherein each one of the plurality of frames includes a plurality of packets, and cause the one of said nodes to set an actual cycle time of the packet of data and wherein each one of the plurality of frames includes a variable length.

2. A computer readable medium having stored thereon a plurality of sequences of instructions, said plurality of sequences of instructions including sequences of instructions which, when executed in a digital network including a plurality of nodes interconnected by a plurality of point-to-point links, cause one of said nodes to set a presentation time stamp field of a first packet of a second frame of data for transmission in the digital network with a presentation time value determined according to a computed packet rate for the data, wherein the data for transmission includes a plurality of frames and wherein each one of the plurality of frames includes a plurality of packets, and cause the one of said nodes to set an actual cycle time of the packet of data and cause said node to compute the packet rate by measuring a difference between a desired presentation time value of a first packet of a preceding frame of the data and an actual transmission time of the first packet of the preceding frame and cause said node to compute a presentation time stamp field of the first packet of the first frame equal to $N+MX+A$ where N is equal to a cycle number of the first packet of the first frame, M is equal to a computed packet rate, X is equal to a frame number corresponding to the first frame, and A is equal to a precomputed offset.

3. A method comprising setting a presentation time stamp field of a packet of data for transmission in a digital network with a presentation time value determined according to a computed packet rate for the data, and setting an actual cycle time of the packet of data wherein said packet of data is a first packet of a second frame of data for transmission in said digital network, wherein the data for transmission includes a plurality of frames, wherein each one of the plurality of frames includes a plurality of packets, wherein the packet rate is computed by measuring a difference between a desired presentation time value of a first packet of a first frame of the data and an actual transmission time of the first packet of the first frame, the first frame preceding the second frame in time of transmission within the network, and setting a presentation time stamp field of the first packet of the first frame to a value equal to $N+MX+A$ where N is equal to a cycle number of the first packet of the first frame, M is equal to a computed packet rate, X is equal to a frame number corresponding to the first frame, and A is equal to a precomputed offset.

4. A method comprising:
setting a presentation time stamp field of a first packet of data of a second frame for transmission in a digital network with a presentation time value determined according to a computed packet rate for the data; and
setting an actual cycle time of the packet of data;
wherein the data for transmission includes a plurality of frames and wherein each one of the plurality of frames includes a plurality of packets;
wherein the packet rate is computed by measuring a difference between a desired presentation time value of a first packet of a first frame of the data and an actual transmission time of the first packet of the first frame, the first frame preceding the second frame in time of transmission within the network, and setting a presentation time stamp field of the first packet of the first frame to a value equal to $N+MX+A$ where N is equal to a cycle number of the first packet of the first frame, M is equal to a computed packet rate, X is equal to a frame number corresponding to the first frame, and A is equal to a precomputed offset.

5. A computer readable medium having stored thereon a plurality of sequences of instructions, said plurality of sequences of instructions including sequences of instructions which, when executed in a digital network including a plurality of nodes interconnected by a plurality of point-to-point links, cause one of said nodes to:
set a presentation time stamp field of a first packet of a second frame of data for transmission in the digital network with a presentation time value determined according to a computed packet rate for the data, wherein the data for transmission includes a plurality of frames and wherein each one of the plurality of frames includes a plurality of packets;
set an actual cycle time of the packet of data;
compute the packet rate by measuring the difference between a desired presentation time value of a first packet of a proceeding frame of the data and an actual transmission time of the first packet of the proceeding frame; and
compute a presentation time stamp field of the first packet of the first frame equal to $N+MX+A$ where N is equal to a cycle number of the first packet of the first frame, M is equal to a computed packet rate, x is equal to a frame number corresponding to the first frame, and A is equal to a precomputed offset.

* * * * *